United States Patent Office 3,725,285

Patented Apr. 3, 1973

3,725,285

MAGNETIC COATING COMPOSITIONS

Hans H. Denk, Vienna, Va., and Joseph J. Sabad, Trenton, N.J., assignors to International Business Machines Corporation, Armonk, N.Y.

No Drawing. Filed June 24, 1970, Ser. No. 49,508
Int. Cl. H01f *1/28*
U.S. Cl. 252—62.54 4 Claims

ABSTRACT OF THE DISCLOSURE

Magnetic coating compositions comprising magnetic oxide pigment and a binder selected from certain water-based acrylic resin emulsions. The compositions of this invention are particularly suitable for imparting magnetic data fields to paper, card stock, film, or other substrates. They are particularly suitable for application to magnetic tapes to be subjected to high transport speeds past magnetic tape heads with which intimate contact must be maintained.

BACKGROUND OF THE INVENTION

Field of the invention

The present invention relates to magnetic coating compositions to be employed for imparting magnetic data fields to various substrates.

Description of the prior art

Magnetic coating compositions containing magnetic oxide particles suspended in a binder composition including a volatile organic solvent are well known. Although such compositions can be advantageously employed to produce suitable magnetic recording elements, the use of such compositions often results in various disadvantages, including the necessity to employ lengthy mixing and milling operations as well as the need to employ extended curing periods under elevated temperatures. In addition to the extended periods of time required for the preparation of magnetic recording elements employing a solvent base magnetic coating composition, some loss of the binder material may be incurred due to the fact that the binder, being in solution, can be carried into the substrate, thus depriving the magnetic pigment of its full complement of binder. In addition, in such systems, some of the oxide may accompany the binder into more porous substrates, causing signal-to-signal ratios which are excessive. Further, the nature of the substrate may be limited in accordance with the solvent employed in the coating composition. Additional disadvantages arise from the fact that many organic solvents are highly flammable and/or toxic to operating personnel, giving rise to the necessity of providing suitable explosion-proof handling and exhaust systems.

As a result of these disadvantages, it has been previously proposed in the art to employ dispersions of magnetic pigments in aqueous resin systems. It has been considered that the use of such compositions would eliminate many of the disadvantages discussed above relating to the presence of a volatile organic solvent. For example, the use of aqueous resin emulsions in such compositions would allow the direct use of resins prepared via emulsion polymerization with the cost saving attendant thereto. Further, in such systems, the water present in the coating composition acts only as a carrier. That is, the discrete resin particles, together with the magnetic pigment, remain at the surface of the substrate until the water is dissipated, thus eliminating the problem of the possible loss of binder and/or magnetic oxide into the substrate. The absence of a volatile organic solvent, of course, decreases cost and eliminates the need for special systems to avoid the possibility of explosions and toxicity hazards.

An example of a proposal to use water-based magnetic coating compositions is the disclosure of Colwill et al. in U.S. Pat. No. 3,023,123 and by Levine in U.S. application Ser. No. 777,558, now abandoned, but referred to in the foregoing patent. These disclosures are directed to magnetic coating compositions comprising an aqueous vehicle containing a dispersing agent, at least 7.5% by weight of discrete resin particles in the form of a synthetic latex dispersion, at least 20% by weight of ferromagnetic iron oxide particles in suspension and at least 0.4% by weight of a water soluble algin. The Colwill et al. and Levine disclosures are primarily directed to the use of an aqueous styrene-butadiene copolymer latex. However, there is also disclosed the use of acrylic latex dispersions such as "Rhoplex B–15" and "Rhoplex B–60–A." In practice, however, several difficulties have been encountered with such compositions. Among them are a tendency toward blocking at elevated temperatures and deformation of the coating under conditions of high transport speeds past write/read heads with which intimate contact must be maintained. Additional problems which have been encountered with such coatings relate to handling and include poor adhesion, poor abrasion resistance, and poor wet rub strength.

SUMMARY OF THE INVENTION

Applicants have now discovered that such problems can be overcome by the incorporation in aqueous magnetic coating compositions of certain acrylic emulsions as hereinafter defined.

DETAILED DESCRIPTION OF THE INVENTION

The magnetic coating compositions of this invention may have the following general composition:

| Composition: | Parts by weight |
|---|---|
| Aqueous acrylic resin emulsion (45–60% solids) | 40–80 |
| Ferromagnetic pigment | 30–60 |
| Dispersing agent | 0–4 |
| Anti-foaming agent | 0–5 |
| Anti-blocking agent | 0–20 |
| Surface hardening agent | 0–20 |
| Modifying agents | 0–10 |

In addition, any of the conventional modifiers for calendering, printing and other operations may be added to further enhance the final properties of the above magnetic coating formulation.

The acrylic resins employed in the aqueous emulsions of the present invention are methylmethacrylate-containing copolymers or terpolymers. As examples of such resins, there may be mentioned copolymers of methylmethacrylate and ethylacrylate containing at least 50% by weight of methylmethacrylate, terpolymers of butylacrylate, methylmethacrylate, and ethylacrylate containing at least 20% by weight of butylacrylate, terpolymers of butylmethacrylate, methylmethacrylate and ethylacrylate containing at least 40% by weight of butylmethacrylate and terpolymers of methylmethacrylate, ethylacrylate and methacrylic acid containing at least 5% of methacrylic acid and the like.

Combinations of the above emulsions may of course be employed depending upon the coating technique to be employed and/or the product application. For example, a cross-linkable acrylic emulsion such as Rhoplex AC–200 may be employed alone or in combination with a non-cross linkable acrylic resin such as AC–35 in order to achieve a particular desired film property.

The other ingredients of the combinations of the present invention listed above are all conventional agents well known in this art which, per se, form no part of this invention. For example, the ferromagnetic oxide or oxides can be any of several which possess the necessary formulation and magnetic properties. Likewise, any dispersing agent can be employed which will disperse the magnetic oxide efficiently. Any of the conventional modified material such as waxes, surface hardeners, anti-blocking agents, glossing agents, curing agents, and bodying materials can be employed to further enhance a coating formulation for a specific application.

The following is a partial list of some representative agents which may be employed in the compositions of the present invention:

Dispersing agents:
- Tertiary acetylenic glycol (Surfynol TG)
- Alkyl aryl polyether alcohol (Triton X–100)
- Potassium tripolyphosphate
- Aerosol C–61

Anti-foaming agents:
- Silicone oil (DC–200)
- Nopco NXZ
- Nopco JMY
- Nopco NDW Magnetic oxides:
- $\gamma$-$Fe_2O_3$
- $Fe_3O_4$
- $CrO_2$
- $\gamma$-$Fe_2O_3$/$Fe_3O_4$ mixtures
- $\gamma$-$Fe_2O_3$ doped wtih cobalt or nickel Anti-blocking agent:
- Amberlac 165

Surface hardening agent:
- Rhoplex B–85

Other modifying agents (and their effect):
- Phenyl mercuric acetate (preservative)
- Rhoplex G–505 (ionomeric acrylic resin used for crosslinking)

The above formulations are amenable to various applications. For example, they can be applied as a wet stripe by deep etch gravure or other film stripe application techniques. When used in this manner, the compositions of the present invention provide several advantages. Drying of the water-based system is greatly simplified and the surface can be easily mechanically worked to a high gloss and excellent smoothness. There is little or no penetration of the binder or oxide into the substrate and flexibility and adhesion to the substrate are excellent. Further, the dried magnetic coating is totally insensitive to moisture. Coatings of this type also offer sharp edges, good magnetic signals, and a very good signal-to-noise ratio. In addition, the coating is not affected by ultraviolet radiation or normal environmental extremes. Wet striping formulations must yield a film that is tough, flexible, wear-resistant, moisture insensitive, and possesses good adhesion to paper.

The formulations of this invention can also be coated on film substrates and then transferred by heat and pressure to other substrates without the need of a primer adhesive. This technique exposes the high gloss finish of the coating which was previously in contact with the film to which it was originally applied. Transfers of this type can be accomplished by hot stamping techniques, continuous laminating and similar processes. Uses in which this technique may be employed include the provision of magnetic data fields on ledger cards, credit cards or any other magnetic data carrying documents. Hot stamping formulations must be somewhat frangible, self-releasing from the carrier substrate, and thermoplastic at elevated temperatures.

The formulations of this invention also are particularly advantageous for use as coating compositions to be used in the preparation of data processing tape. Such coatings must provide a dry film which is very abrasion resistant, tough, smooth and of high cohesive strength.

The advantages provided by the compositions of the present invention are many. Simple mixing and application techniques can be used. No curing of the coating is required. The magnetic coatings obtained possess excellent flexibility. That is, no delamination occurs when the substrate undergoes flexing during usage. The magnetic coatings obtained possess high gloss and a surface finish which is extremely smooth. Excellent adhesion to a large variety of substrates may be obtained. Little or no penetrtaion into the coating substrate occurs. In addition, the wear resistance of the coatings produced in accordance with the present invention is excellent.

The following examples will further illustrate the present invention. Examples 1–3 illustrate typical compositions of the present invention suitable for the techniques described above. Example 4 is a comparative example illustrating the improved results of the compositions of the present invention as compared with those of the prior art. All proportions are by weight unless otherwise indicated; and all aqueous acrylic resin emulsions have 45–60% solids.

EXAMPLE 1

A typical specific formulation for wet striping is as follows:

| Composition | Example and supplier | Parts | Percent |
|---|---|---|---|
| Acrylic emulsion (a 40:60 ethyl acrylate and methyl methacrylate copolymer) | Rhoplex AC–35 (Rohm & Haas) | 73.0 | 56.4 |
| Magnetic Pigment ($\gamma$—$Fe_2O_3$) | Hercules HR–283 | 50.0 | 38.6 |
| Anti-blocking agent (aqueous solution of $NH_4$ salt of a phthalic anhydride/castor oil alkyd resin). | Amberlac 165 (Rohm & Haas) | 4.0 | 3.1 |
| Surface hardening agent (terpolymer of butylmethacrylate, methylmethacrylate and ethyl acrylate—60:10:30). | Rhoplex B–85 | 1.0 | .8 |
| Dispersing agent (ethanolated alkyl guanidine-amine complex) | Aerosol C–61 (American Cyanamid) | 1.0 | .8 |
| Antifoaming agent (blend of hydrocarbons, metallic soaps, nonionic emulsifier and silicones) | Nopco NXZ (Nopco Chemical Co.) | 0.5 | .3 |
| Total | | 129.5 | 100.0 |

Similar compositions could be employed for all applications by varying the composition depending on the product application.

EXAMPLE 2

A specific formulation for heat transfer from a substrate without the use of a primer adhesive (hot stamping and laminating) is as follows:

| Composition | Example and supplier | Parts | Percent |
|---|---|---|---|
| Acrylic emulsion (terpolymer of butylacrylate, methyl methacrylate and ethyl acrylate—30:50:20). | Rhoplex B–60A (Rohm & Haas) | 50.0 | 39.2 |
| Acrylic emulsion | Rhoplex AC–35 (Rohm & Haas) | 30.0 | 23.5 |
| Magnetic pigment ($Fe_3O_4$) | IRN 100 (Chas. Pfizer & Co.) | 40.0 | 31.3 |
| Anti-blocking agent | Amberlac 165 (Rohm & Haas) | 5.0 | 3.9 |
| Dispersing agent (sodium salt of polymerized alkyl aryl sulfonic acid) | Darvan No. 2 (R.T. Vanderbilt Co.) | 0.7 | .5 |
| Antifoaming agent | Nopco NXZ (Nopco Chemical Company) | 2.0 | .6 |
| Total | | 127.7 | 100.0 |

EXAMPLE 3

A specific formulation for a magnetic tape coating is as follows:

| Composition | Example and supplier | Parts | Percent |
|---|---|---|---|
| Acrylic emulsion | Rhoplex AC-35 (Rohm & Haas) | 55.0 | 48.8 |
| Acrylic emulsion (terpolymer of methyl methacrylate, ethyl acrylate and methacrylic acid—50:30:20). | Rhoplex AC-200 (Rohm & Haas) | 5.0 | 4.4 |
| Magnetic pigment ($Fe_3O_4$) | MO-2035 (Chas. Pfizer & Co.) | 48.0 | 42.6 |
| Dispersing agent | Aerosol C-61 (American Cyanamid) | 1.0 | .9 |
| Antiforming agent | Nopco NXZ (Nopco Chemical Company) | 0.8 | .7 |
| Conductive carbon | Conductex SC (Columbian Carbon Co.) | 3.0 | 2.6 |
| Total | | 112.8 | 100.0 |

EXAMPLE 4

In order to compare the properties of coatings produced by the present invention with those of the prior art, the following compositions were prepared.

(A) Prior art coating composition

| Composition: | Parts by wt. |
|---|---|
| Styrene-butadiene copolymer latex (60:40) | 117.0 |
| $Fe_2O_3$ (HR–283) | 167.2 |
| Sodium alginate | 3.3 |
| Sodium polyphosphate | 1.0 |
| Polyethylene glycol laurate | 1.0 |
| Water | 250.0 |

(B) Composition of this invention

| Composition: | Parts by wt. |
|---|---|
| Acrylic latex (AC–35) | 54.75 |
| $Fe_2O_3$ (HR–283) | 37.5 |
| Amberlac 165 | 3.0 |
| Acryloid B–85 | 0.75 |
| Aerosol C–61 | 0.75 |
| Nopco NXZ | 0.4 |

Two additional coatings, C and D, were also formulated as in A, substituting, respectively, Rhoplex B–15 and Rhoplex B–60–A, disclosed by Colwill et al. and Levine, supra, for the styrene-butadiene copolymer latex.

The above compositions were each then coated on white cardstock and 1 mil Mylar film and air dried. The resultant samples were then subjected to testing to determine their resistance to moisture and elevated temperatures. The results of these tests are set forth below.

| | Coating | | | |
|---|---|---|---|---|
| | A | B | C | D |
| (1) Adhesion to cardstock to Mylar | Poor<br>Fair | Excellent.<br>Good | Excellent<br>Very good | Excellent.<br>Very good. |
| (2) Abrasion resistance* (5 stroke—Sutherland) | Poor | Good | Good | |
| (3) Flexibility* | Good | do | Excellent | Excellent for up to 5 manual folds. Poor after 10 folds. |
| (4) Wet rub strength* (3 sec. immersion) | Very poor | do | Excellent | Excellent. |
| (5) Blocking (at 160° F. against cardstock) | None | None | Very slight tackiness. | Slight tackiness. |
| (6) Blocking (at 160° F. ink to ink) | | | Severe | Severe. |
| (7) Resistance to thermal deformation* | Fair | Good | Poor | Poor. |

*As applied to both cardstock and polyester (Mylar) film.

What is claimed is:

1. An aqueous magnetic coating composition comprising, by weight, between about 53 and 63% of an aqueous acrylic resin emulsion having 45–60% solids, consisting of a methylmethacrylate-ethyl acrylate copolymer containing 60% by weight of methylmethacrylate, and a terpolymer of methylmethacrylate and ethyl acrylate and a third compound taken from the class consisting of butyl acrylate, butylmethacrylate and methacrylic acid, the butylmethacrylate being employed in 08% of terpolymer for wet striping applications, the butylacrylate being employed in 39.2% of terpolymer for heat-transferred coatings, and the methacrylic acid being employed in 4.4% of terpolymer for magnetic tape coating applications, and the remainder of the composition including a magnetic pigment, and a dispersing agent capable of dispersing the magnetic pigment.

2. An aqueous magnetic coating composition comprising, by weight, approximately

53% of an aqueous acrylic resin emulsion having 45–60% solids consisting of a methylmethacrylate-ethyl acrylate copolymer containing over 50% by weight of methylmethacrylate, and a terpolymer of methylmethacrylate, ethyl acrylate and methacrylic acid containing approximately 50% methylmethacrylate and approximately 20% methacrylic acid, the ratio of copolymer to terpolymer being of the order of about 10:1, and the remainder of the composition including a magnetic pigment, approximately 1% dispersing agent capable of dispersing the ferromagnetic oxide pigment, and approximately 1% antifoaming agent.

3. The coating composition of claim 2 wherein the magnetic pigment comprises over 40% by weight of $Fe_3O_4$.

4. An aqueous magnetic coating composition consisting essentially of 55 parts by weight of an aqueous acrylic resin emulsion having 45–60% solids and constituting a copolymer of methylmethacrylate and ethyl acrylate (substantially 60:40 by weight), 5 parts by weight of an aqueous acrylic resin emulssion having 45–60% solids constituting a terpolymer of methylmethacrylate, ethyl acrylate and methacrylic acid (substantially 50:30:20 by weight), 48 parts by weight of magnetic pigment, 1 part by weight of a dispersing agent capable of dispersing the ferromagnetic oxide pigment, 1 part antifoaming agent, and 3 parts conductive carbon.

References Cited

UNITED STATES PATENTS

| | | | |
|---|---|---|---|
| 3,023,123 | 2/1962 | Colwill et al. | 117—44 |
| 3,240,621 | 3/1966 | Flower et al. | 117—93.2 |
| 3,200,007 | 8/1965 | Flowers | 117—138.8 |

PATRICK P. GARVIN, Primary Examiner

A. P. DEMERS, Assistant Examiner

U.S. Cl. X.R.

117—44, 235